United States Patent

Weider et al.

Patent Number: 5,356,965
Date of Patent: Oct. 18, 1994

[54] FLAME-RESISTANT POLYCARBONATE MOLDING COMPOSITIONS

[75] Inventors: Richard Weider, Leverkusen; Thomas Scholl, Bergisch Gladbach; Klaus Kircher, Leverkusen; Klaus Horn, Krefeld, all of Fed. Rep. of Germany

[73] Assignee: Bayer Aktiengesellschaft, Leverkusen, Fed. Rep. of Germany

[21] Appl. No.: 60,379

[22] Filed: May 11, 1993

Related U.S. Application Data

[63] Continuation-in-part of Ser. No. 940,565, Sep. 4, 1992, abandoned.

[51] Int. Cl.⁵ .................... C08K 5/15; C08K 5/42
[52] U.S. Cl. ..................... 524/108; 524/159; 524/161; 524/162
[58] Field of Search ............ 524/108, 159, 161, 162

[56] References Cited

U.S. PATENT DOCUMENTS

| | | | |
|---|---|---|---|
| 3,812,178 | 5/1974 | Weedon et al. | 524/162 |
| 3,926,908 | 12/1975 | Mark | 260/45.7 S |
| 3,933,734 | 1/1976 | Mark et al. | 524/162 |
| 3,940,366 | 2/1976 | Mark | 260/45.9 R |
| 3,953,399 | 4/1976 | Mark | 260/45.85 H |
| 3,978,024 | 8/1976 | Mark | 524/162 |
| 4,104,246 | 8/1978 | Mark | 260/45.7 S |
| 4,224,205 | 9/1980 | Nakagawa et al. | 524/162 |
| 4,450,249 | 5/1984 | Schmidt et al. | 524/161 |
| 4,501,838 | 2/1985 | Hechenbleikner et al. | 524/108 |
| 4,533,690 | 8/1985 | Rosenquist | 524/162 |
| 4,535,108 | 8/1985 | Rosenquist et al. | 524/162 |

*Primary Examiner*—Kriellion S. Morgan
*Attorney, Agent, or Firm*—Joseph C. Gil; Aron Preis

[57] ABSTRACT

Flame-resistant polycarbonate molding compositions containing halogen-free sulphonic acid salts of aromatic aldehydes or acetals of these aldehydes in quantities of about 0.005 to 10% relative to the total weight of the composition are disclosed. The compositions optionally further containing inorganic sulphates, exhibit flame retardance and little tendency to dripping in comparison to prior art compositions.

8 Claims, No Drawings

FLAME-RESISTANT POLYCARBONATE MOLDING COMPOSITIONS

CROSS-REFERENCE TO RELATED APPLICATION

The present application is a continuation-in-part of U.S. application Ser. No. 07/940,565 filed on Sep. 4, 1992 now abandoned.

FIELD OF THE INVENTION

The invention concerns polycarbonate-based thermoplastic molding compositions, and more particularly, flame-resistant compositions.

SUMMARY OF THE INVENTION

Flame-resistant polycarbonate molding compositions containing halogen-free sulphonic acid salts of aromatic aldehydes or acetals of these aldehydes in quantities of about 0.005 to 10% relative to the total weight of the composition are disclosed. The compositions, optionally further containing inorganic sulphates exhibit flame retardance and little tendency to dripping in comparison to prior art compositions.

BACKGROUND OF THE INVENTION

The effect of aromatic sulphonic acid salts as flame-retardant additives for polycarbonates is known and has been described, e.g. in U.S. Pat. Nos. 3,933,734 and 3,940,366. Sulphonic acid salts of aromatic carboxylic acids, carboxylic acid esters and ketones have also been described (U.S. Pat. Nos. 3,953,399, 3,926,908 and 4,104,246). The examples given in the said Patent Specifications confirm that the halogen-free sulphonates mentioned there are significantly inferior to the halogen containing salts of the preferred range. In particular, all mixtures tested with monomeric, halogen-free additives were classified as "dripping with burning" even at a dose of 1% by weight and on test bodies from 3.2 to 1.6 mm in thickness.

It has now surprisingly been found that aromatic polycarbonate compositions containing halogen-free sulphonic acid salts of aromatic aldehydes and their acetal derivatives, optionally in combination with inorganic sulphates, are extinguished much more quickly and have less tendency to drip than the halogen-free compositions described in the above Patent Specifications. The salts are equal in their effect to halogen-containing sulphonates such as, for example, perfluorobutane sulphonate. In particular, the UL-94 combustibility class of VO can be achieved with the compositions of the invention in test samples 3.2 mm in thickness at very small doses without the addition of further additives. This is all the more surprising as their action surpasses even that of chemically very similar compositions such as the above-mentioned carboxylic acids or ketones. Their higher flame-resistance is demonstrated, for example, in test samples 1.6 mm in thickness, in which the additives according to the invention result in substantially reduced after-burning times. Sulphonates according to the invention also have other advantages, such as ease of accessibility, low cost and improved color of the polycarbonate compositions.

DETAILED DESCRIPTION OF THE INVENTION

All aromatic polycarbonates may be used according to the invention but it is preferred to use polycarbonates which are obtainable by the reaction of diphenols, in particular dihydroxydiarylalkanes, with phosgene or diesters of carbonic acid. Apart from unsubstituted dihydroxydiarylalkanes, those in which the aryl groups carry methyl groups in the o- and/or m-position to the hydroxyl group are also suitable.

Branched polycarbonates are also suitable. Monophenols, for example, may be used as chain terminators and tris- or tetraphenols as branching agents.

The polycarbonates are preferably built up of halogen-free phenolic components.

The thermoplastic polycarbonates which are to be rendered flame-resistant according to the invention are known from the literature or may be prepared by processes known from the literature.

The polycarbonates to be used according to the invention include thermoplastic aromatic homopolycarbonates and copolycarbonates based, for example, on one or more of the following diphenols:
Hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones,
α,α-bis-(hydroxyphenyl)-diisopropylbenzenes,
and derivatives thereof which are alkylated or halogenated in the nucleus. These and other suitable diphenols are described, for example, in U.S. Pat. Nos. 3,028,365, 3,275,601, 3,148,172, 3,062,781, 2,991,273, 3,271,367, 2,999,835, 4,982,014 and 2,999,846, in German Offlegungsschriften Nos. 1,570,703, 2,063,050, 2,063,052, 2,211,956 and 2,211,957, in French Patent Specification No. 1,516,518 and in the Monograph by H. Schnell, "Chemistry and Physics of Polycarbonates", Interscience Publishers, New York, 1964.

The following are examples of preferred diphenols:
4,4'-Dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)propane, bis-(3,5-dimethyl-4-hydroxyphenyl)-methane, 2,2-bis-(3,5-dimethyl-4-hydroxyphenyl)-methane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropyl-benzene and 1,1-bis-(4-hydroxyphenyl)-3,3,5-trimethylcyclohexane.

The following, for example, are particularly preferred diphenols:
2,2,-Bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethyl-cyclohexane.

Preferred aromatic polycarbonates are those based on one or more of the above-mentioned preferred diphenols. Copolycarbonates based on 2,2-bis-(4-hydroxyphenyl)-propane and one of the other diphenols mentioned as preferred are particularly preferred. Homopolycarbonates of 2,2-bis-(4-hydroxyphenyl)-propane or of 1,1-bis-(4-hydroxyphenyl)-3,3,5-trimethylcyclohexane are also particularly preferred.

The aromatic polycarbonates may be prepared by known processes, e.g. from bisphenol and diphenylcarbonate by the solvent-free transesterification process or from bisphenols and phosgene by the diphasic interface process, as described in the literature mentioned above.

The aromatic polycarbonates may be branched by the incorporation of small quantities, preferably from 0.05 to 2.0 mol-% (based on the diphenols used) of trifunctional compositions, for example compositions having three or more phenolic hydroxyl groups.

Polycarbonates of this type are described, for example, in German Offenlegungsschriften Nos. 1,570,533, 1,595,762, 2,116,974 and 2,113,347, British Patent Specification No. 1,079,821, U.S. Pat. No. 3,544,514 and German Offenlegungsschrift No. 2,500,092.

The following are some examples of suitable compositions having three or more phenolic hydroxyl groups: Phloroglucinol, 4,6-Dimethyl-2,4,6-tri-(4-hydroxyphenyl)-heptene-2; 4,6-dimethyl-2,4,6-tri-(4-hydroxyphenyl)-heptane; 1,3,5-tri-(4-hydroxyphenyl)-benzene, 1,1,1-tri(4-hydroxyphenyl)-ethane, tri-(4-hydroxyphenyl)-phenyl-methane, 2,2-bis-[4,4-bis-(4-hydroxyphenyl)-cyclohexyl-propane, 2,4-bis-(4-hydroxyphenylisopropyl)-phenol, 2,6-bis-(2'-hydroxy-5'-methylbenzyl)-4methylphenol, 2-(4-hydroxyphenyl)-2-(2,4-dihydroxy-phenyl)propane, hexa-(4-(4-hydroxyphenyl-isopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. 2,4-Dihydroxybenzoic acid, trimesic acid, cyanuric chloride and 3,3-bis-(4-hydroxy-3-methyl-phenyl)-2-oxo-2,3-dihydroxyindole are further examples of trifunctional compositions.

The aromatic polycarbonates should generally have a weight average molecular weight (Mw) of from 10,000 to over 100,000, preferably from 20,000 to 40,000, determined by measuring the relative viscosity in $CH_2Cl_2$ at 25° C. and at a concentration of 0.5 g in 100 ml of $CH_2Cl_2$.

The molecular weight (Mw) of the polycarbonates is adjusted in known manner by addition of the calculated quantities of chain terminators such as phenol or halogenated phenols or alkyl phenols.

Suitable halogen-free sulphonic acid salts are especially those corresponding to formula (I)

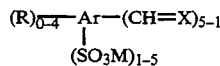  (I)

wherein
Ar denotes an aromatic group having 1 to 4 aromatic rings,
M stands for a metal of group 1a, 1b, 2a or the Periodic System of Elements,
R denotes hydrogen or a halogen-free radical selected from the group consisting of $C_1$–$C_6$-alkyl, $C_6$–$C_{10}$-aryl, $C_1$–$C_6$-alkoxy, acylamino or acylimino radical, and
X stands for oxygen or a halogen-free polyvalent group having the structure $R'(-O-)_{2-6}$ or two halogen-free monovalent R'—O—groups,
in which R' stands for an optionally branched, halogen-free $C_2$–$C_{20}$-alkyl or alkylene group or halogen-free $C_6$–$C_{10}$-aryl or arylene group or halogen-free $C_7$–$C_{20}$- aralkyl or aralkylene group which may connect several structural units (I).

The sulphonic acid salts according to the invention are derived from aromatic sulphonic acids containing aldehyde groups. These may easily be prepared by known processes, e.g. from the underlying aldehydes by sulphonation, from aromatic halogenated aldehydes by replacement of the halogen by the sulphonate group or from sulphonates by formylation. The flame protective action is produced both by the aldehydes and by their acetal derivatives obtained by acid catalyzed reaction with alcohols or phenols with elimination of water. Monohydric alcohols lead to acyclic acetals having two R' groups per aldehyde group, diols and ortho-diphenols lead to simple cyclic acetals, and when tri- or tetra-alcohols or -phenols are used, two aldehyde groups are linked together via the alcohol or phenol group. If the alcohol or phenol used for acetalization contains two or more hydroxyl groups the corresponding acetals may be oligomeric or polymeric.

Formula I is therefore an abbreviation for the reactions:

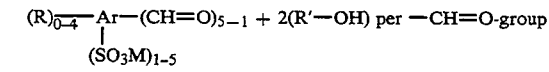

or

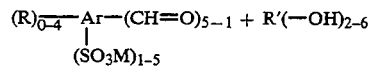

wherein per —CH=O group two OH-Groups of $R'(OH)_{2-6}$ are calculated.

The following are examples of compositions which may be used in the form of their metal salts as aldehyde group containing sulphonates according to the invention: 2-Formyl-benzene sulphonic acid, 3-formyl-benzene sulphonic acid, 4-formyl-benzene sulphonic acid, 5-formyl-2-methyl-benzene sulphonic acid, 5-formyl-2-methoxy-benzene sulphonic acid, 5-formyl-2-hexadecyloxy-benzene sulphonic acid, 2-formyl-benzene-1,5-disulphonic acid, 2,4-diformyl-benzene sulphonic acid, 2-formyl-5-phenyl-benzene sulphonic acid, biphenyl-4'-formyl-4-sulphonic acid, biphenyl-4,4'-bis-formyl-2,2'-disulphonic acid, 2-formyl-5-(acetylamino)-benzene sulphonic acid and 2-formyl-5-(phthalimino)-benzene sulphonic acid and their acetals which may be obtained, for example, by reacting the above-mentioned aldehydes with the following hydroxyl compositions:

Methanol, ethanol, n-propanol, n-butanol, isobutyl alcohol, isopentyl alcohol, 2-ethylhexanol, benzyl alcohol, 2-phenyl-ethanol, 3-phenyl-1-propanol, ethylene glycol, propylene glycol, 1,3-propanediol, 1,2-butylene glycol, 1,3-butanediol, 2,3-butanediol, neopentyl glycol, 2,5-hexanediol, 2-methyl-2-propyl-1,3-propanediol, 2,2-diethyl-1,3-propanediol, glycerol, 2-hydroxymethyl-2-methyl-1,3-propanediol, 1,1,1-trimethylol-propane, pentaerythritol, sorbitol, mannitol, 1,2-cyclohexanediol, 1,4-cyclohexane-dimethanol, bis-hydroxymethylhexahydro-4,7-methanoindan, pyrocatechol, 1,4-bis-(2-hydroxyethoxy)-benzene, 4-tert.-butylpyrocatechol, 2,3-naphthalene diol, 1,8-naphthalene diol, 2,2'-dihydroxy-biphenyl, 3,4-dihydroxybiphenyl, 2,2-bis-(4-hydroxyphenyl)-propane, 2,2-bis-(4-(2-hydroxyethoxy)-phenyl)-propane and 2,2- bis-(4-(2,3-di-hydroxypropoxy)-phenyl)-propane, glycerol-1-phenyl ether, glycerol-1-(nonylphenyl)-ether, glycerol-1-(p-cumyl-phenyl)-ether, 2,2-bis-(4-(2,3-dihydroxy-propoxy)-phenyl) propane and 1-stearine.

The metal cation of the sulphonates may be from a metal of group Ia, Ib, IIa or IIb of the Periodic System, in particular lithium, sodium, potassium, magnesium, calcium or zinc. Metals from the alkali metal and alkaline earth metal group are preferred.

The polycarbonate molding compositions according to the invention are prepared by the usual methods, e.g. by mixing the additives with the polycarbonate granulate and then processing the mixture or by adding a concentrate of the required additives in polycarbonate into the granulate which is to be processed.

The present invention thus also relates to a process for the preparation of the polycarbonate molding compositions according to the invention, characterized in that the halogen-free sulphonic acid salts of aromatic aldehydes or acetals of these aldehydes, optionally in combination with inorganic sulphates, are mixed in the usual manner, either as such or in the form of a polycarbonate concentrate, with the polycarbonate resin which is to be rendered flame-resistant, and the mixture is then processed.

Other known additives may be incorporated in the polycarbonate molding compositions according to the invention in addition to the sulphonic acid salts used according to the invention, e.g. glass fibers, fillers, pigments, UV stabilizers, antioxidants, hydrolysis protective agents, mold release agents and known polymers as well as antidripping agents which prevent burning drips, e.g. Teflon.

The proportion of sulphonic acid salts according to the invention in the polycarbonate composition may vary within wide limits but undesirable changes in the physical properties of the polycarbonate occur above 10% by weight whereas no flame-protective action is obtained when these salts are added in quantities below 0.005% by weight.

Since the flame-protective action is obtained even with the addition of very small quantities, the sulphonic acid salts according to the invention are preferably used in quantities of from 5 to 0.01% by weight.

The sulphonic acid salts according to the invention may be O used both in their pure form and in commercial quality which are characterized by containing from 0 to 50% by weight of inorganic sulphates such as sodium or potassium sulphate. Such combinations may in certain cases produce synergistic effects.

All the compositions according to the invention corresponding to Formula (I) have a high flame-protective action, regardless of the nature of group X. Compounds in which X stands for oxygen are preferred because they are more readily available.

Salts of 2- and 4-formyl-benzene sulphonic acid and their acetal derivatives are particularly preferred, especially the salts of 2-formylbenzene sulphonic acid and of 4-formylbenzene sulphonic acid.

The polycarbonate molding compositions according to the invention may be worked up into any molded products, including films, by known methods, using the conventional processing machines.

The flame-resistant polycarbonate molding compositions according to the invention are suitable for the production of injection molded or extruded articles which are required to meet high standards of flame resistance, e.g. products in the electrical, building, vehicle and aircraft sectors.

EXAMPLES

Example 1 to 13

99.9 Parts of an aromatic polycarbonate of 2,2-bis-(4-hydroxyphenyl)-propane which has been treated with a mold release agent (melt index 7 to 10 (300° C.); Makrolon 2805, Trade Product of Bayer AG) were compounded at 300° C. with the addition of 0.1 parts of the additives shown below and the resulting granulate was extruded to produce test rods measuring 127×12.7×3.2 mm. The test rods were then subjected to a combustibility test in accordance with Regulation UL 94 (combustibility of solid synthetic resin samples, Underwriters Laboratories) and allocated to combustibility classes V0 to V2 or failed (V failed). In addition, the average after-burning times of 5 flaming tests were determined in seconds. The color of the test rods was assessed visually and given color numbers 1 to 5.

1: colorless,
2: very slight yellow tinge,
3: slight yellow tinge,
4: marked yellow tinge,
5: severe discoloration.

The Table shows the results of the tests with various additives according to the invention by comparison with material which has not been flame protected.

| No. | Additive (0.1% by wt.) | UL 94 class | Burning time [sec] | Color |
|---|---|---|---|---|
| 1 | Comparison without Additive | V failed | 33 | 1 |
| 2 | 2-Formyl-benzenesulphonic acid sodium | V0 | 6.8 | 1-2 |
| 3 | 2-Formyl-benzene sulphonic acid ethylene acetal sodium | V0 | 4.8 | 3 |
| 4 | 5-Formyl-2-methyl benzene sulphonic acid sodium | V0 | 5.8 | 2 |
| 5 | 5-Formyl-2-methoxy-benzene sulphonic acid sodium | V1 | 8.2 | 1 |
| 6 | 2-Formyl-benzene-1,5-disulphonic acid-disodium | V2 | 14.2 | 2 |
| 7 | 2-Formyl-benzenesulphonic acid-2,2-dimethyl-propyl-1,3-ene acetal sodium | V0 | 5.8 | 2 |
| 8 | 2-Formyl-benzenesulphonic acid-cyclohexyl-1,2-ene-acetal sodium | V0 | 4.8 | 2 |
| 9 | 4-Formyl-benzenesulphonic acid sodium | V0 | 6.0 | 1-2 |
| 10 | Biphenyl-4'-formyl-4-sulphonic acid sodium | V0 | 7.0 | 1 |
| 11 | 2-Formyl-benzenesulphonic acid sodium (commercial, contains 23% by weight sodium sulphate) | V0 | 7.0 | 2 |
| 12*) | 2-Formyl-benzenesulphonic acid sodium (commercial, contains 23% by weight sodium sulphate) | V0 | 6.8 | 1 |
| 13*) | 2-Formyl-benzenesulphonic acid sodium (pure) | V1 | 8.0 | 1 |

*)0.03% by weight additive

Examples 14 to 22

99.9 Parts of an aromatic polycarbonate of 2,2-bis-(4-hydroxyphenyl)-propane treated with mold release agent (Melt index 7 to 10 (300° C.); Makrolon 2805, Trade Product of Bayer AG) were compounded at 300° C. with the addition of 0.1 parts of the additives shown below and the resulting granulate was extruded to form test rods measuring 127×12.7×1.6 mm. The results were assessed as in Examples 1 to 13. Examples 14 to 17 are according to the invention and 18 to 22 are provided for comparison. The additives containing formyl groups are surprisingly found to have significantly shorter after-burning times for a given dose than the chemically very similar comparison compositions which have no aldehyde function, and they are equal in effect to a halogenated sulphonate (Example 18).

| No. | Additive (0.1% by wt.) | UL 94 class | Burning time [sec] | Color |
|---|---|---|---|---|
| 14 | 2-Formyl-benzenesulphonic acid sodium | V2 | 7.4 | 1–2 |
| 15 | 5-Formyl-2-methyl-benzene sulphonic acid sodium | V2 | 8.4 | 2 |
| 16 | 2-Formyl-benzenesulphonic acid ethylene acetal sodium | V2 | 9.6 | 3 |
| 17 | 5-Formyl-2-methoxy-benzene sulphonic acid sodium | V2 | 9.8 | 1 |
| 18 | Perfluorobutane sulphonic acid potassium | V2 | 9.2 | 1 |
| 19 | 4-Acetylbenzene-sulphonic acid sodium | V2 | 10.2 | 2–3 |
| 20 | 4-Sulpho-benzene-sulphonic acid ethyl ester sodium | V2 | 11.4 | 1 |
| 21 | Xylylene disulphonic acid disodium | V2 | 12.6 | 4 |
| 22 | 2-Nitrobenzene sulphonic acid sodium | V2 | 15.6 | 5 |

The Formula (I) with respect to "X":
If X=O, formula (Ia) has the following structure:

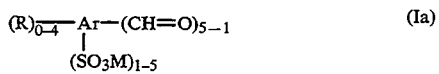

If X corresponds to two monovalent R'—O— groups, Formula (Ib) has the following structure:

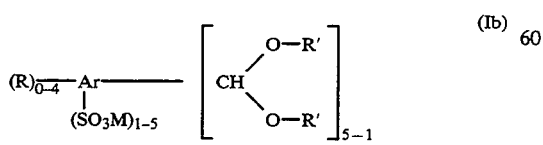

If the aldehyde function (CH=X) reacts with dialcohols or diphenols resulting in R'(—O—)$_2$ respectively:

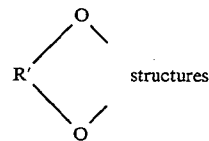

structures of formula (Ic) result having the following structure:

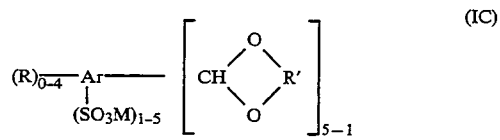

Alternatively to the cyclic acetals (Ic) there may be obtained oligomeric acetals (Id) as explained for the monoaldehydes:

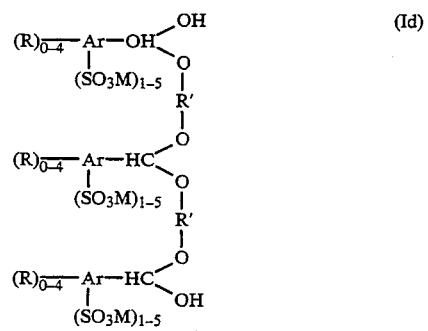

If the aldehyde function (CH=X) reacts with trialcohols or triphenols, there reacts always more than one aldehyde molecule for obtaining oligomeric acetals wherein R'—(O—)$_3$ or

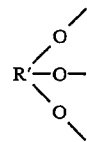

structures are involved, again explained for the monoaldehydes:

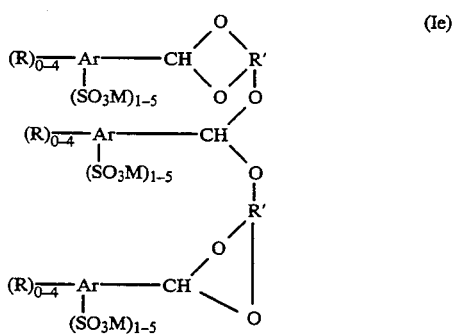

If the aldehyde function (—CH=X) reacts with tetraalcohols or tetraphenols, there reacts also always more than one aldehyde molecule for obtaining oligomeric acetals wherein R'—(O—)₄ respectively

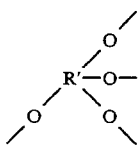

structures are involved, of e.g.

(If), again explained for the monoaldehydes:

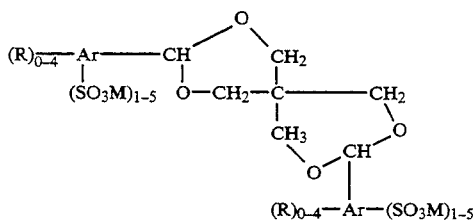

Herein pentaerythritol is the tetraalcohol R'(OH)₄. It is clear for those skilled in the art that the reaction with penta-alcohols respectively pentaphenols result in analogous $$R'(O-)_5$$

or

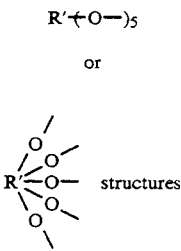 structures

The same situation is clear for hexaalcohols or hexaphenols wherein R'—(O—)₆ or

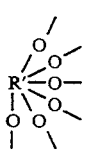

structures are involved, again explained for the monoaldehydes.

The same explanation of Formula (I) is applicable if two —(CH=X) groups are present on one molecule (I), and react with a dialcohol or diphenol R'(OH)₂ which may result, for example, in (Ig):

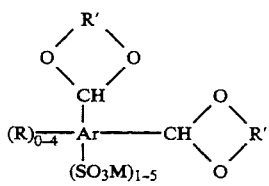

The structures obtained are analogous if a bisaldehyde reacts with trisalcohol or trisphenol R'(OH)₃ respectively tetraalcohol or tetraphenol R'(OH)₄ respectively pentaalcohol or pentaphenol R'(OH)₅ respectively hexaalcohol or hexaphenol R'(OH)₆.

This reaction is analogous if trisaldehydes, tetraaldehydes or pentaaldehydes are involved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising polycarbonate resin and about 0.005 to 10% by weight of a halogen-free sulphonic acid salt conforming to

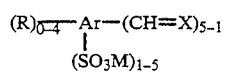 (I)

wherein

Ar denotes an aromatic group having one to 4 aromatic rings,

M is a metal of Group 1a, 1b, 2a or 2b of the Periodic System of Elements,

R denotes hydrogen or a halogen-free radical selected from the group consisting of C₁-C₆-alkyl, C₆-C₁₀-aryl, C₁-C₆-alkoxy, acylamino group and acylimino group, and X stands for oxygen or a halogen-free polyvalent group having the structure R'(—O—)₂₋₆ or two halogen-free monovalent R'—O—groups, R' denotes a halogen-free C₂-C₂₀-alkyl or alkylene group, a halogen-free C₆-C₁₀-aryl or arylene group or a halogen-free C₇-C₂₀-aralkyl or aralkylene group which may link together several structural units (I).

2. The composition of claim 1 wherein said salt is present in an amount of about 0.01 to 5% by weight.

3. The composition of claim 1 wherein said R' is branched.

4. The composition of claim 1 wherein M denotes a metal of Group 1a or 2a.

5. The composition of claim 1, wherein X denotes oxygen.

6. The composition of claim 1, wherein said acid is 2-formyl-benzene sulphonic acid or the acetal derivative thereof or wherein said acid is 4-formyl-benzene sulphonic acid or the acetal derivative thereof.

7. The composition of claim 1, further comprising an inorganic sulphate.

8. The composition of claim 1 wherein said acid is selected from the group consisting of 2-Formyl-benzene sulphonic acid, 3-formyl-benzene sulphonic acid, 4-formyl-benzene sulphonic acid, 5-formyl-2-methyl-benzene sulphonic acid, 5-formyl-2-methoxy-benzene sulphonic acid, 5-formyl-2-hexadecyloxy-benzene sulphonic acid, 2-formyl-benzene-1,5-disulphonic acid, 2,4-diformyl-benzene sulphonic acid, 2-formyl-5-phenyl-benzene sulphonic acid, biphenyl-4'-formyl-4-sulphonic acid, biphenyl-4,4'-bis-formyl-2,2'-disulphonic acid, 2-formyl-5-(acetylamino)-benzene sulphonic acid and 2-formyl-5-(phthalimino)-benzene sulphonic acid.

* * * * *